United States Patent [19]

Kagata

[11] 4,062,548
[45] Dec. 13, 1977

[54] PICKUP ARM LIFTING DEVICE
[75] Inventor: Akira Kagata, Neyagawa, Japan
[73] Assignee: Matsushita Electric Industrial Co., Ltd., Japan
[21] Appl. No.: 667,559
[22] Filed: Mar. 17, 1976
[30] Foreign Application Priority Data
  Mar. 20, 1975 Japan .................................. 50-34130
[51] Int. Cl.² ............................................. G11B 3/10
[52] U.S. Cl. .................. 274/23 B; 274/23 R
[58] Field of Search ................... 274/9 R, 9 A, 23 R, 274/23 A, 23 B

[56] References Cited
U.S. PATENT DOCUMENTS

| | | | |
|---|---|---|---|
| 2,915,315 | 12/1959 | Rabinow | 274/23 A X |
| 3,156,472 | 11/1964 | Brock | 274/23 R |
| 3,292,935 | 12/1966 | Cooper | 274/23 R |
| 3,511,509 | 5/1970 | Firestone | 274/9 R A |
| 3,623,734 | 11/1971 | Toyonaka et al. | 274/23 R X |
| 3,830,505 | 8/1974 | Rabinow | 274/23 R X |
| 4,023,130 | 5/1977 | Ridler et al. | 274/23 R X |

Primary Examiner—Charles E. Phillips
Attorney, Agent, or Firm—Burgess, Ryan and Wayne

[57] ABSTRACT

A pickup arm lifting device in which a follower magnet is attached to the lower end of a slide shaft disposed for vertical movement for lifting or lowering a pickup arm, and a lifting magnet and a lowering magnet are mounted on an operating plate and are so magnetically oriented that the lifting magnet repels the follower magnet while the lowering magnet attracts the follower magnet, whereby when the operating plate is so displaced as to bring the lifting or lowering magnet in line with the follower magnet, the follower magnet is repelled away from or attracted toward said lifting or lowering magnet and consequently the slide shaft is lifted or lowered to lift or lower the pickup arm.

11 Claims, 10 Drawing Figures

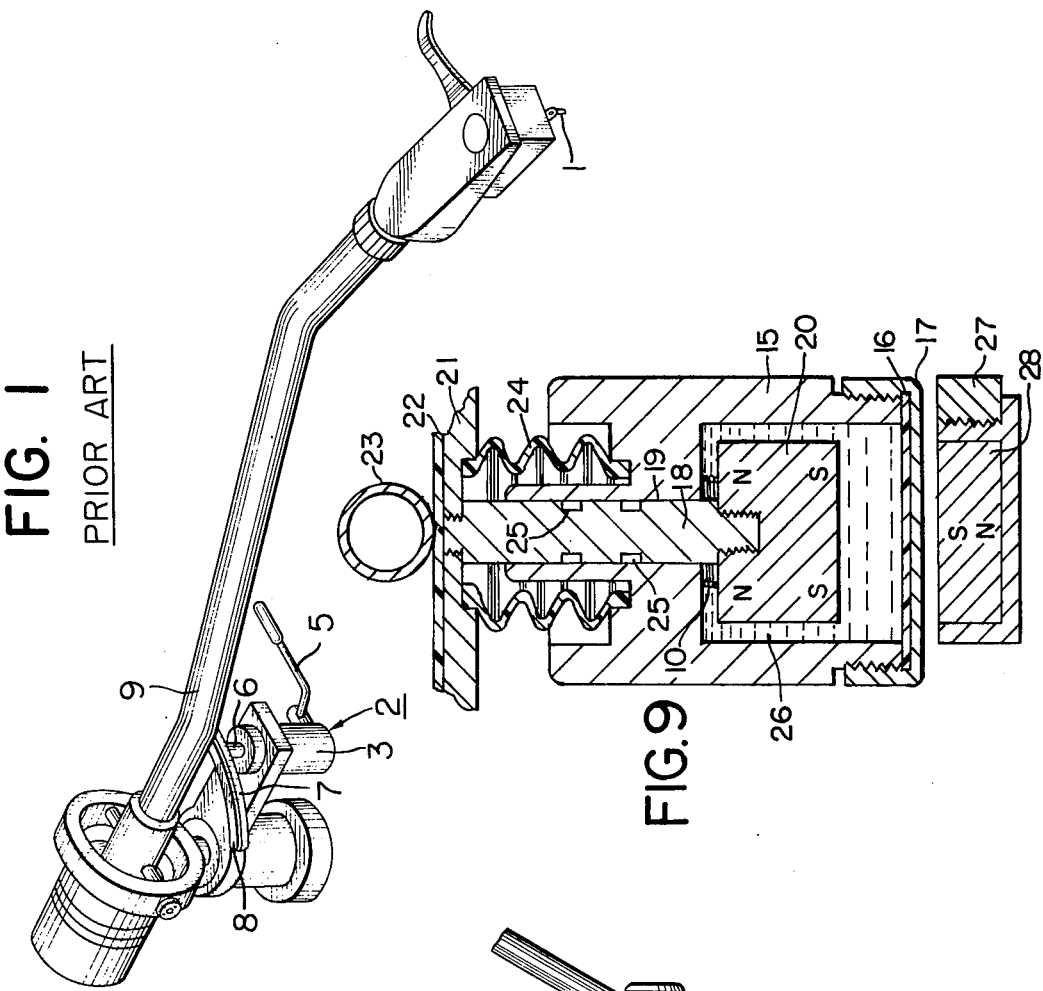
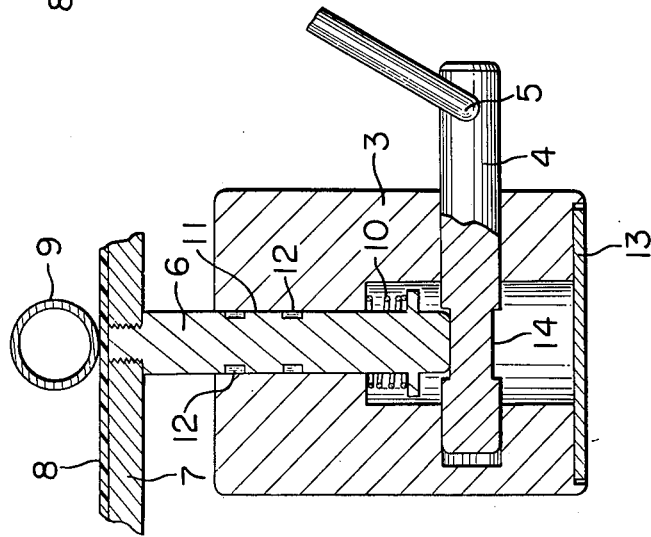

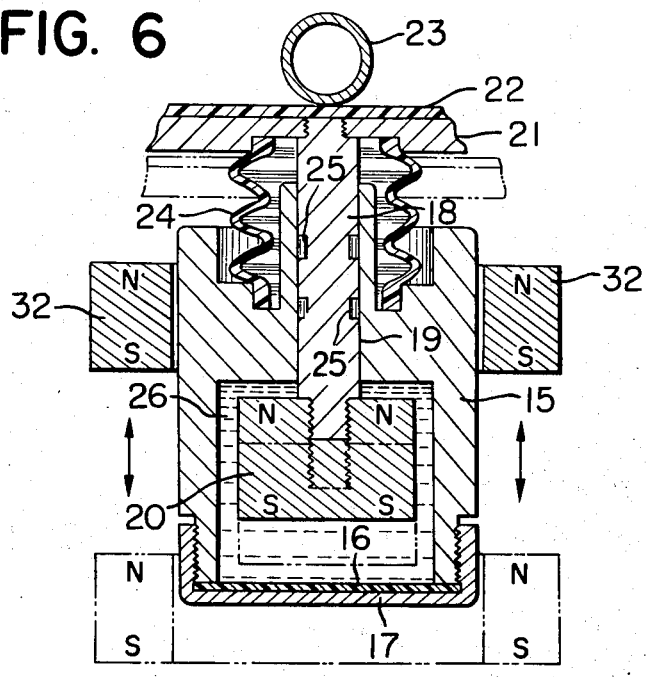
FIG. 6
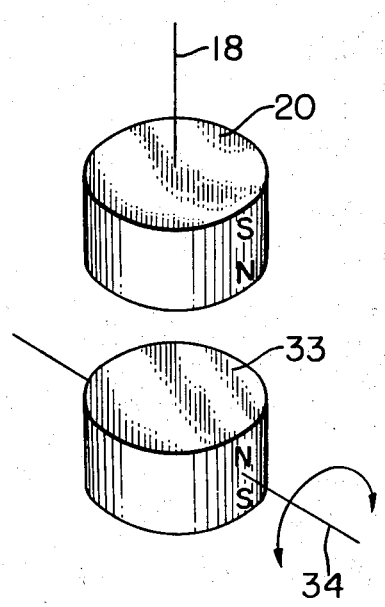
FIG. 7
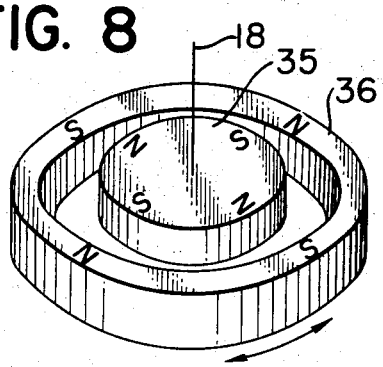
FIG. 8 (A)
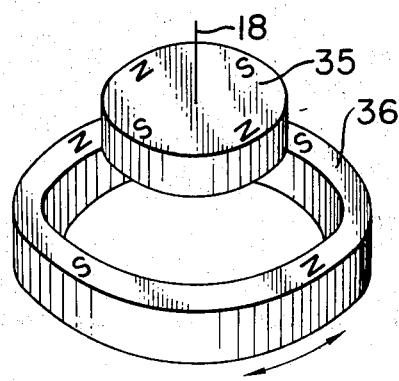
(B)

4,062,548

PICKUP ARM LIFTING DEVICE

BACKGROUND OF THE INVENTION

The present invention relates to a pickup arm lifting device for use in a record player.

In general, the pickup or tone arms are provided with a device for providing the slow motion let-down for a stylus head or cartridge or lifting the stylus head away from the surface of a disk. This pickup arm lifting device comprises a housing, a slide shaft slidably fitted into the housing for vertical movement, a bias spring for normally biasing the slide shaft downward, a rotary shaft rotatably fitted into the housing for rotation about the axis perpendicular to the axis of the slide shaft, the rotary shaft being provided with a notched portion or cam semicircular in cross section with which engages the lower end of the slide shaft, and an operating lever attached to the end portion of the rotary shaft extended out of the housing. Upon rotation of the rotary shaft, the semicircular notched portion or cam forces the slide shaft to lift against the spring, thereby causing the pickup arm to lift away from the disk. Upon further rotation of the rotary shaft, the lower end of the slide shaft rides on the chord portion of the semicircular cam so that the slide shaft is lowered under the returning force of the bias spring. In general, the viscous oil is applied to the side surface of the slide shaft so that the slow motion let-down for cartridge is provided depending upon the viscosity of the oil and the returning force of the bias spring.

The conventional pickup arm lifting device with the above construction however has the following defects:

1. The semicircular notched or cam portion of the rotary shaft is in direct engagement with the lower end of the slide shaft to force it to rise. Therefore, when one rotates the operating lever too rapidly, the slide shaft is lifted too quickly so that the pickup arm bounces on a lift arm connected to the upper end of the slide shaft. This gives unpleasant sensations; and 2. Aging problem arises because the viscous oil leaks out of the gap between the slide shaft and the housing as well as the gap between the rotary shaft and the housing, and is vaporized. As a result, the pickup arm lifting device cannot provide a slow motion let-down for the cartridge, which is the most important function of the lifting device.

SUMMARY OF THE INVENTION

In view of the above, one of the objects of the present invention is to provide a pickup arm lifting device which may substantially overcome the defects encountered in the prior art devices and which may ensure a slow motion let-down for the cartridge at a desired speed in a stable and reliable manner.

Another object of the present invention is to prevent the leakage and resultant vaporization of viscous oil from the housing of a pickup arm lifting device, thereby ensuring the further stable and reliable operation.

To the above and other objects, the present invention provides a pickup arm lifting device comprising a slide shaft disposed for vertical movement for lifting or lowering a pickup arm; a follower magnet attached to said slide shaft; and a driving magnet means for driving said follower magnet, whereby the displacement of said driving magnet means causes the vertical movement of said slide shaft.

BRIEF DESCRIPTION OF THE DRAWING

FIG. 1 is a perspective view of a prior art pickup arm system;

FIG. 2 is a sectional view of a pickup arm lifting device thereof;

FIG. 6 is a sectional view of a second embodiment, same reference numerals being used to designate parts similar to those shown in FIG. 5; and FIGS. 7 to 10 are diagrammatic views illustrating some modifications of the arrangement of a driving magnet and a follower magnet.

Figure 3:
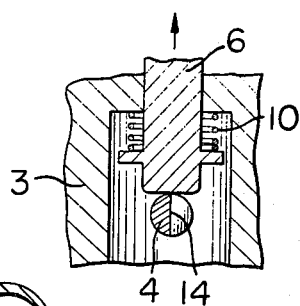
FIG. 3 is a fragmentary view thereof showing a slide shaft in the raised position.

DESCRIPTION OF THE PREFERRED EMBODIMENTS:

Prior Art, FIGS. 1 through 4

In FIG. 1 there is shown a conventional pickup arm having a stylus 1 and a pickup arm lifting device 2 for providing a slow motion let-down for the stylus 1 and lifting the stylus 1 away from the disk surface. As shown in FIG. 2, the arm lifting device 2 comprises a cylindrical housing 3, a rotary shaft 4 rotatably fitted into the housing 3 at right angles to the axis thereof, an operating lever 5 extended from the end portion of the rotary shaft 4 extended out of the housing 3, a slide shaft 6 slidably fitted into an axial slide shaft hole 11 of the housing 3, a lift arm 7 attached to the upper end of the slide shaft 6 and covered with a rubber sheet 8 for preventing the slippage of a pickup arm 9 on the lift arm when the arm 9 is lifted or lowered, a coiled compression spring 10 fitted over the lower end portion of the slide shaft 6 in order to normally biasing downward the slide shaft 6 so as to assure that the lower end of the slide shaft 6 is always in contact with the rotary shaft 4, and a bottom plate 13. A viscous oil such as silicon oil is applied to the surface of the slide shaft 6 in contact with the surface of the hole 11, and annular oil grooves 12 are cut into the side surface of the slide shaft 6 in order to supply the oil for forming an oil film over the slide shaft 6.

Figure 4:
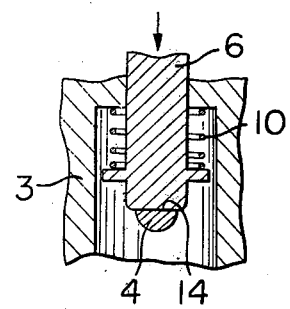
FIG. 4 is a view similar to FIG. 3, but shows the slide shaft in the lowered position.

The portion 14 of the rotary shaft 4 in contact with the lower end of the slide shaft 6 is notched semicircular in cross section as best shown in FIGS. 3 and 4 so that the rotary shaft 4 may be prevented from being pulled off from the housing 3. When the rotary shaft 4 is rotated, the slide shaft 6 is lifted as shown in FIG. 3 or lowered as shown in FIG. 4. More particularly, when the rotary shaft 4 is rotated in one direction, the notched portion 14 forces the slide shaft 6 to lift against the spring 10 as shown in FIG. 3. When the rotary shaft 4 is rotated in the other direction from the position shown in FIG. 3, the slide shaft 6 is lowered at a relatively slow speed which is dependent upon the returning force of the spring 10 and the retarding force provided by the viscous oil between the slide shaft 6 and the wall surface of the hole 11, whereby the slow motion let-down for the pickup may be provided.

The conventional lifting device with the above construction, however, has the following defects:

1. When the rotary shaft 4 is rotated in one direction, the notched portion 14 in contact with the lower end of the slide shaft 6 forces the latter to lift. Therefore, when one rotates the operating lever 5 too rapidly, the slide shaft 6 lifts at such a high speed as to cause the so-called bouncing phenomenon; that is, the bouncing of the tone arm 9 over the rubber sheet 8 which produces unpleasant sensations;

2. The viscous oil tends to leak out through the gap between the rotary shaft 4 and the housing 3 and the gap between the slide shaft 6 and the hole 11, and is evaporated. That is, the aging of the lifting device occurs so that it cannot provide a slow motion let-down for the pickup, which is the most important function of the device; and 3. The viscosity of the oil used changes depending upon the ambient temperature so that the sliding motion of the slide shaft 6 is slow at a low temperature and fast at a high temperature. In other words, the desired sliding speed of the slide shaft 6 cannot be attained independently of the ambient temperature.

THE INVENTION

Figure 5:
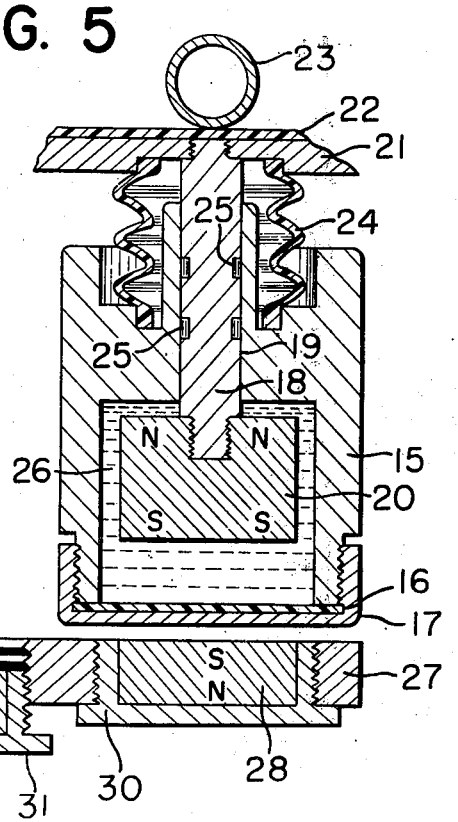
FIG. 5 is a sectional view of a first embodiment of a pickup arm lifting device in accordance with the present invention.

First Embodiment, FIG. 5

In FIG. 5 there is shown a first embodiment of a pickup arm lifting device in accordance with the present invention, comprising a cylindrical housing 15 the bottom of which is air-tightly closed with a packing 16 and a bottom plate 17, a slide shaft 18 slidably fitted into an axial slide-shaft hole 19 of the housing 15, a cylindrical follower magnet 20 attached to the lower end of the slide shaft 18 coaxially thereof, and a lift arm 21 attached to the upper end of the slide shaft 18 and covered with a rubber sheet 22 for preventing the slippage of a tone arm 23. The lifting device further includes a bellows 24 interposed between the top of the housing 15 and the undersurface of the lift arm 21 so as to surround the slide shaft 18. The bellows 24 is so disposed that it may be relatively freely expanded or compressed in the axial direction of the slide shaft 18. A viscous oil such as silicon oil is filled into the space 26 of the housing 15 in which is housed the follower magnet 20, and is applied to the side surface of the slide shaft 18. Annular oil grooves 25 are cut into the side surface of the slide shaft 18 in order to reserve the viscous oil which forms a film over the side surface of the slide shaft 18.

An operating plate 27 is positioned below and spaced apart from the bottom plate 17 by a suitable distance, and is movable in the direction perpendicular to the axis of the housing 15. A lifting magnet 28 is mounted in a magnet holder 30 which in turn is screwed into the operating plate 27. The direction of the lifting magnet 28 is opposite to that of the follower magnet 20. That is, in this embodiment since the N-pole of the follower magnet 20 is directed upward while the S-pole, downward, the S-pole of the lifting magnet 28 is directed upward while the N-pole, downward. In like manner, a lowering magnet 29 is mounted in a lowering magnet holder 31 which in turn is screwed into the operating plate 27. The direction of the lowering magnet 29 is same as that of the follower magnet 20. That is, the N-pole is directed upward while the S-pole, downward. Either of the lifting or lowering magnet 28 or 29 (e.g. driving means) may be brought in line with the follower magnet 20 by the displacement of the operating plate 27 in either direction. The distance between the lifting or lowering magnet 28 or 29 and the follower magnet 20 may be suitably adjusted by a means for mechanically positioning said magnet by loosening or tightening the magnet holder 30 or 31 out of or into the operating plate 27. The cylindrical housing 15, bottom plate 17, slide shaft 18, lift arm 21, tone arm 23, operating plate 27 and magnet holders 30, 31 are made of non-magnetic material.

Next the mode of operation will be described. When the operating plate 27 is displaced so as to bring the lifting magnet 28 into alignment with the follower magnet 20, the follower magnet 20 and hence the slide shaft 18 is lifted under the repulsive force interacting between the lifting and follower magnets 28 and 20. On the other hand, when the lowering magnet 29 is brought in line with the follower magnet 20, the follower magnet 20 and hence the slide shaft 18 is lowered under the attracting force interacting between the lowering and follower magnets 29 and 20. When the slide shaft 18 is lifted, the tone arm 23 is also lifted while when the slide shaft 18 is lowered, the tone arm 23 is lowered.

The novel features and advantages of the above pickup arm lifting device may be summarized as follows:

1. Since the operating plate 27 is not physically or directly coupled to the slide shaft 18, even when the lifting magnet 28 is suddenly brought into the operative position in line with the follower magnet 20, the sudden lift of the slide shaft 18 may be prevented so that the so-called bouncing phenomenon will never occur;

2. The viscous oil is hermtically sealed so that no aging problem will arise; and 3. The attracting force interacting between the lowering magnet 29 and the follower magnet 20 as well as the repulsive force interacting between the lifting magnet 28 and the follower magnet 20 may be suitably adjusted by the adjustment of the distances between them so that the problem of the change in lifting or lowering speed of the slide shaft due to the change in viscosity of the oil depending upon the surrounding temperature may be eliminated.

Modification, FIG. 6

In FIG. 6 there is shown one modification of the pickup arm lifting device in accordance with the present invention, which modification is substantially similar in construction to the first embodiment described above with reference to FIG. 5 except that instead of the lifting and lowering magnets 28 and 29, a ring-shaped driving magnet 32 is used. The ring-shaped driving magnet 32 is magnetized in the same direction with the follower magnet 20, and is loosely fitted over the housing 15. Therefore, when one raises the driving magnet 32 as shown by the solid lines, the magnet 32 attracts the follower magnet 20 so that the slide shaft 18 is lifted. In like manner, when the driving magnet 32 is lowered to the position shown by the broken lines, the driving magent 32 attracts the follower magnet 20 downward so that the slide shaft 18 is lowered.

Modification, FIG. 7

In the modification shown in FIG. 7, a cylindrical driving magnet 33 is so carried by a rotary shaft 34 that it may rotate through 180° about the axis perpendicular to the axis of the driving magnet 33. Therefore, either the N- or S-pole of the driving magnet 33 may be selectively brought into the opposed relationship with the N-pole of the follower magnet 20. When the N-pole of the driving magnet 33 is brought into the opposed relationship with the N-pole of the follower magnet 20 as shown in FIG. 7, the follower magnet 20 is repelled from the driving magnet 33 so that the slide shaft 18 is lifted. On the other hand, when the S-pole of the driving magnet 33 is brought into the opposed relationship with the N-pole of the follower magnet 20, the magnet 20 is attracted toward the driving magnet 33 so that the slide shaft 18 is lowered. It is readily understood that this modification may be applied to the first embodiment shown in FIG. 5.

Modification, FIG. 8

In the modification shown in FIG. 8, a follower magnet 35 is in the form of a disk and has two pairs of N-and S-poles angularly spaced apart from each other by 90° around the periphery as shown in FIG. 8. The follower magnet 35 is so arranged that it may not rotate about its axis. For this purpose, suitable well-known means such as a sliding key may be used.

A driving magnet 36 is in the form of a ring and has two pairs of N- and S-poles equiangularly spaced apart from each other around the periphery as shown.

When the driving magnet 36 is rotated so that the opposite poles of the driving magnet 36 and the follower magnet 36 are in opposed relation as shown in FIG. 8(A), the driving and follower magnets 36 and 35 attract each other. On the other hand, when the driving magnet 36 is so rotated that the same poles are brought into the opposed relationship, the driving and follower magnets 36 and 35 repel each other as shown in FIG. 8(B). This modification may be applied to the lifting device shown in FIG. 6. That is, when the follower magnet 35 is attached to the slide shaft 18, the objects of the present invention may be attained.

Other Modifications

Figure 10:
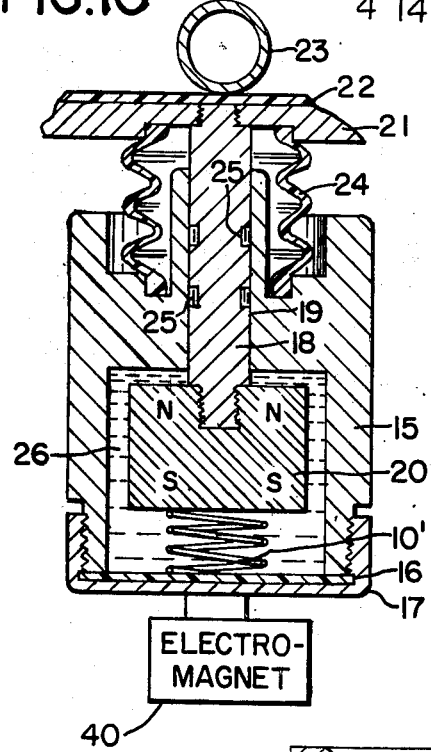

The lifting device shown in FIG. 9 is similar to that of FIG. 5 except that, the lowering magnet 29 has been eliminated, and instead the coiled spring 10 shown in FIG. 2 has been used. Alternatively, as shown in FIG. 10, the lifting magnet 28 may be eliminated, and instead a coiled spring 10' normally biasing upwardly the follower magnet 20 may be used. In the latter case, either of the lowering magnet 29 or the follower magnet 20 may be replaced by a block made of magnetic material. In FIG. 6, the follower magnet 20 or the driving magnet 32 may also be replaced by a block made of magnetic material. Furthermore, instead of the lifting and lowering magnets 28 and 29 which are permanent magnets, an electromagnet 40 may be used, so that as shown in FIG. 10, remote control of the pickup lifting device may be realized.

What is claimed is:

1. A pickup arm lifting device comprising a slide shaft disposed for vertical movementgfor lifting or lowering a pickup arm, a follower permanent magnet attached to said slide shaft, a driving means for generating a magnetic field in the vicinity of said follower magnet to apply a driving force to said follower magnet, and means for mechanically positioning said driving means relative to said magnet to change the magnitude of said driving force which causes the vertical movement of said slide shaft by magnetic force acting between said driving means and said follower magnet.

2. A pickup arm lifting device comprising a slide shaft disposed for vertical movement for lifting or lowering a pickup arm, said shaft contacting the undersurface of said arm, a follower block which is made of permanently magnetized magnetic material attached to said slide shaft, driving means comprising a magnet for driving said follower block, and means for mechanically moving said driving means relative to said magnetic material so that the vertical displacement thereof causes the vertical movement of said slide shaft.

3. A pickup arm lifting device comprising a slide shaft disposed for vertical movement for lifting or lowering a pickup arm, a follower magnet attached to the lower end of said slide shaft, and a driving means for providing a moving magnetic field in the vicinity of said follower magnet thereby driving said follower magnet, whereby the displacement of said driving means causes the vertical movement of said slide shaft by magnetic force acting between said driving means and said follower magnet, said driving means comprising two magnets so magnetically oriented that one of them attracts said follower magnet while the other repels said follower magnet, and a magnet mounting means disposed for horizontal movement below said follower magnet supporting said two magnets, whereby the displacement in the horizontal direction of said magnet mounting means causes the vertical movement of said slide shaft.

4. A pickup arm lifting device comprising a slide shaft disposed for vertical movement for lifting or lowering a pickup arm, a follower magnet attached to the lower end of said slide shaft, and a driving means for providing a moving magnetic field in the vicinity of said follower magnet thereby driving said follower magnet, whereby the displacement of said driving means causes the vertical movement of said slide shaft by magnetic force acting between said driving means and said follower magnet, said driving means comprising an annular magnet loosely fitted over said follower magnet and so magnetically oriented that the vertical movement of said annular driving magnet causes the vertical movement in the same direction of said follower magnet.

5. A pickup arm lifting device comprising a slide shaft disposed for vertical movement for lifting or lowering a pickup arm, a follower magnet attached to the lower end of said slide shaft, and a driving means for providing a moving magnetic field in the vicinity of said follower magnet thereby driving said follower magnet whereby the displacement of said driving means causes the vertical movement of said slide shaft by magnetic force acting between said driving means and said follower magnet, said driving means comprising a magnet disposed below said follower magnet for rotation about the axis perpendicular to the axis of said follower magnet and so magnetically oriented that the magnetic repulsive or attracting force interacting between said follower magnet and said driving magnet causes lifting or lowering of said slide shaft.

6. A pickup arm lifting device comprising a slide shaft disposed for vertical movement for lifting or lowering a pickup arm, a follower magnet attached to said slide shaft, and a driving means for providing a moving magnetic field in the vicinity of said follower magnet thereby driving said follower magnet, said follower magnet being in the form of a disk and having two pairs of magnetic poles equiangularly spaced apart from each other around the periphery thereof, said disk-shaped magnet being attached to the lower end of said slide shaft for non-rotational vertical movement, said driving means comprising an annular magnet with two pairs of magnetic poles equiangularly spaced apart from each other around the periphery thereof, said annular magnet being disposed radially outwardly of and coaxially with said disk-shaped follower magnet, whereby the magnetic repulsive or attracting force produced between said driving and follower magnets by the rotation of said driving magnet causes lifting or lowering of said slide shaft.

7. A pickup arm lifting device comprising a slide shaft disposed for vertical movement for lifting or lowering a pickup arm, a follower magnet attached to the lower end of said slide shaft, a spring for normally downwardly biasing said magnet and shaft, and a driving means for providing a moving magnetic field in the vicinity of said follower magnet thereby driving said follower magnet, said driving means comprising a magnet which repels said follower magnet and is able to move horizontally below said follower magnet, whereby the displacement of said driving means causes the vertical movement of said slide shaft by magnetic force acting between said driving means and said follower magnet.

8. A pickup arm lifting device comprising a slide shaft disposed for vertical movement for lifting or lowering a pickup arm, a follower magnet attached to the lower end of said slide shaft, a spring normally biasing said magnet and shaft upwardly, and a driving means for providing a moving magnetic field in the vicinity of said follower magnet thereby driving said follower magnet, said driving means comprising a magnet which attracts said follower magnet and is able to move horizontally below said follower magnet, whereby the displacement of said driving means causes the vertical movement of said slide shaft by magnetic force acting between said driving means and said follower magnet.

9. A pickup arm lifting device comprising a slide shaft disposed for vertical movement for lifting or lowering a pickup arm, a follower magnet attached to the lower end of said slide shaft, a spring normally biasing said magnet and shaft upwardly, and a driving means for providing a moving magnetic field in the vicinity of said follower magnet thereby driving said follower magnet, said driving means comprising a block which is made of magnetic material and able to move horizontally below said follower magnet, whereby the displacement of said driving means causes the vertical movement of said slide shaft by magnetic force acting between said driving means and said follower magnet.

10. A pickup arm lifting device comprising a slide shaft disposed for vertical movement for lifting or lowering a pickup arm, a follower magnet attached to the lower end of said slide shaft, a housing, said follower magnet being immersed in a viscous oil filling an enclosed space defined within said housing, said slide shaft being slidably mounted in said housing, a bellows interposed between the top of said housing and the upper end of said slide shaft for providing an air sealed enclosure aaound said slide shaft extended out of said housing, said bellows being expandable or compressible in the direction of the vertical sliding movement of said slide shaft, and a driving means for providing a moving magnetic field in the vicinity of said follower magnet thereby driving said follower magnet, whereby the displacement of said driving means causes the vertical movement of said slide shaft by magnetic force acting between said driving means and said follower magnet.

11. A pickup arm lifting device comprising a slide shaft disposed for vertical movement for lifting or lowering a pickup arm, a follower magnet attached to said slide shaft, and a driving means for providing a changeable magnetic field in the vicinity of said follower magnet thereby driving said follower magnet, said driving means comprising an electromagnet so constructed that the poles thereof may be selectively reversed, whereby said driving means causes the vertical movement of said slide shaft by magnetic force acting between said driving means and said follower magnet.

* * * * *

UNITED STATES PATENT OFFICE
CERTIFICATE OF CORRECTION

Patent No. 4,062,548       Dated December 13, 1977

Inventor(s) Akira Kagata

It is certified that error appears in the above-identified patent and that said Letters Patent are hereby corrected as shown below:

Column 4, line 29: "hermtically" should be --hermetically--.

line 57: "magent" should be --magnet--.

Column 5, lines 50,51: "so that as shown in FIG. 10," should be --as shown in FIG. 10, so that --.

line 55: "movementgfor" should be --movement for--.

Column 8, line 18: "aaound" should be --around--.

Signed and Sealed this

Sixteenth Day of May 1978

[SEAL]

Attest:

RUTH C. MASON
Attesting Officer

LUTRELLE F. PARKER
Acting Commissioner of Patents and Trademarks